(12) United States Patent  
Jones et al.

(10) Patent No.: US 8,539,353 B2  
(45) Date of Patent: Sep. 17, 2013

(54) TABS FOR MANAGING CONTENT

(75) Inventors: Michael Jones, San Francisco, CA (US); Ryan Devenish, San Francisco, CA (US); Jonathan Kaplan, San Francisco, CA (US); John Furlan, Belmont, CA (US); Elizabeth A. Cleary, San Francisco, CA (US); Matthew John Barthelemy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 600 days.

(21) Appl. No.: 12/750,562

(22) Filed: Mar. 30, 2010

(65) Prior Publication Data

US 2011/0246929 A1    Oct. 6, 2011

(51) Int. Cl.  
*G06F 3/00*    (2006.01)

(52) U.S. Cl.  
USPC ............ 715/711; 715/715; 715/808; 715/863

(58) Field of Classification Search  
USPC .......................................................... 715/711  
See application file for complete search history.

(56) References Cited

U.S. PATENT DOCUMENTS

| | | | |
|---|---|---|---|
| 6,133,898 A * | 10/2000 | Ludolph et al. ............... | 715/790 |
| 7,490,300 B2 * | 2/2009 | Morrill et al. .................. | 715/810 |
| 7,543,245 B2 * | 6/2009 | Irimajiri ........................ | 715/836 |
| 7,562,312 B2 * | 7/2009 | Rochford et al. ............. | 715/848 |
| 8,015,498 B2 * | 9/2011 | Shigenobu .................... | 715/765 |
| 8,205,169 B1 * | 6/2012 | Donohoe et al. .............. | 715/790 |
| 2002/0033848 A1 * | 3/2002 | Sciammarella et al. ....... | 345/838 |
| 2003/0160815 A1 * | 8/2003 | Muschetto .................... | 345/733 |
| 2003/0174174 A1 * | 9/2003 | Fitzpatrick et al. ........... | 345/809 |
| 2004/0155909 A1 * | 8/2004 | Wagner ......................... | 345/854 |
| 2005/0114778 A1 * | 5/2005 | Branson et al. ............... | 715/711 |
| 2006/0022897 A1 * | 2/2006 | Windover et al. ............. | 345/32 |
| 2006/0059468 A1 * | 3/2006 | Heirich ......................... | 717/125 |
| 2006/0156247 A1 * | 7/2006 | McCormack et al. ........ | 715/767 |
| 2006/0161868 A1 * | 7/2006 | Van Dok et al. .............. | 715/835 |
| 2007/0005576 A1 * | 1/2007 | Cutrell et al. ...................... | 707/3 |
| 2007/0067798 A1 * | 3/2007 | Wroblewski ..................... | 725/37 |
| 2008/0216014 A1 * | 9/2008 | Kurtenbach et al. .......... | 715/808 |
| 2008/0307330 A1 * | 12/2008 | Louch et al. ................... | 715/763 |
| 2008/0307364 A1 * | 12/2008 | Chaudhri et al. ............. | 715/836 |
| 2009/0019401 A1 * | 1/2009 | Park et al. ..................... | 715/841 |
| 2009/0125831 A1 * | 5/2009 | Dandurand ................... | 715/772 |
| 2009/0288005 A1 * | 11/2009 | Stapleton et al. ............. | 715/711 |
| 2009/0300522 A1 * | 12/2009 | Haynes et al. ................ | 715/762 |
| 2009/0327448 A1 * | 12/2009 | Williams et al. ............. | 709/217 |
| 2010/0088634 A1 * | 4/2010 | Tsuruta et al. ................ | 715/800 |
| 2010/0251124 A1 * | 9/2010 | Geppert et al. ............... | 715/734 |
| 2010/0306702 A1 * | 12/2010 | Warner ......................... | 715/811 |
| 2011/0050975 A1 * | 3/2011 | Chung ...................... | 348/333.02 |
| 2011/0087982 A1 * | 4/2011 | McCann et al. .............. | 715/769 |
| 2011/0087989 A1 * | 4/2011 | McCann et al. .............. | 715/772 |
| 2011/0185301 A1 * | 7/2011 | Geller et al. .................. | 715/769 |
| 2011/0202882 A1 * | 8/2011 | Forstall et al. ................ | 715/835 |

(Continued)

*Primary Examiner* — Ryan Pitaro  
(74) *Attorney, Agent, or Firm* — Patterson & Sheridan, LLP

(57) ABSTRACT

A computer-implemented method for interacting with a file stored on a computing device that includes a display. The method includes causing a first user interface element to be displayed; receiving user input; determining that the user input is received for a duration of time greater than a threshold value; and, in response to determining, causing a first full tab to be displayed on a first side of the first user interface element, where the first full tab is associated with a first function for manipulating the file.

17 Claims, 6 Drawing Sheets

(56) References Cited

U.S. PATENT DOCUMENTS

2011/0209099 A1* 8/2011 Hinckley et al. .............. 715/863
2011/0283222 A1* 11/2011 McIntyre et al. .............. 715/777
2012/0144293 A1* 6/2012 Kim .............................. 715/255
2012/0226979 A1* 9/2012 Harberts et al. .............. 715/702

* cited by examiner

TABS FOR MANAGING CONTENT

BACKGROUND

1. Field of the Invention

The present invention relates generally to a user interface for hand-held devices and, more specifically, to tabs for managing content.

2. Description of the Related Art

Digital video camera (DVC) technology has developed rapidly over the past decade. A broad variety of DVCs are now available to meet the diverse needs of a wide spectrum of consumers. DVC technology provides a user with a convenient device that records video and audio and also provides the ability to transfer the recorded video and audio to a computer-readable medium. The computer-readable medium may be, for example, a Digital Video Disc (DVD) or a computer memory.

A DVC user typically records video and audio by activating a recording mode of the DVC and pointing the lens of the DVC towards an area of interest to record the subject matter in that area. Other operating modes include, without limitation, replaying recorded video, deleting saved videos, increasing the volume of the audio, and zooming in or out. The DVC user typically selects the different modes by manipulating a set of interface buttons located on the DVC. The interface buttons typically correspond to a graphical user interface (GUI) that is displayed on a view screen.

One problem often encountered by DVC users involves the complexity of the various features that are accessible to the user via the various interface buttons. Most DVC interfaces are fairly non-intuitive. Oftentimes, the user has to first become skilled at manipulating the interface buttons and GUI before effective video recording can take place. Some users even resort to carrying the DVC manual with them when recording videos in order to operate the many functions of the DVC properly. The complexity of interacting with the interface buttons and the GUI detracts from the overall user experience of recording and playing back videos using the DVC.

Accordingly, there remains a need in the art for a user interface for a digital video camera that overcomes the limitations associated with the prior art techniques discussed above.

SUMMARY

One embodiment of the invention provides a method for interacting with a file stored on a computing device that includes a display. The method includes causing a first user interface element to be displayed; receiving user input; determining that the user input is received for a duration of time greater than a threshold value; and, in response to determining, causing a first full tab to be displayed on a first side of the first user interface element, where the first full tab is associated with a first function for manipulating the file.

One advantage of the embodiments of the invention is that users can more easily identify functionality associated with a particular GUI element. Implementing "tabs" to provide certain functionality simplifies the typical learning curve that is associated with manipulating the user interface of a hand-held device. Another advantage is that the device can be manufactured having fewer mechanical buttons, resulting in cheaper manufacturing cost.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
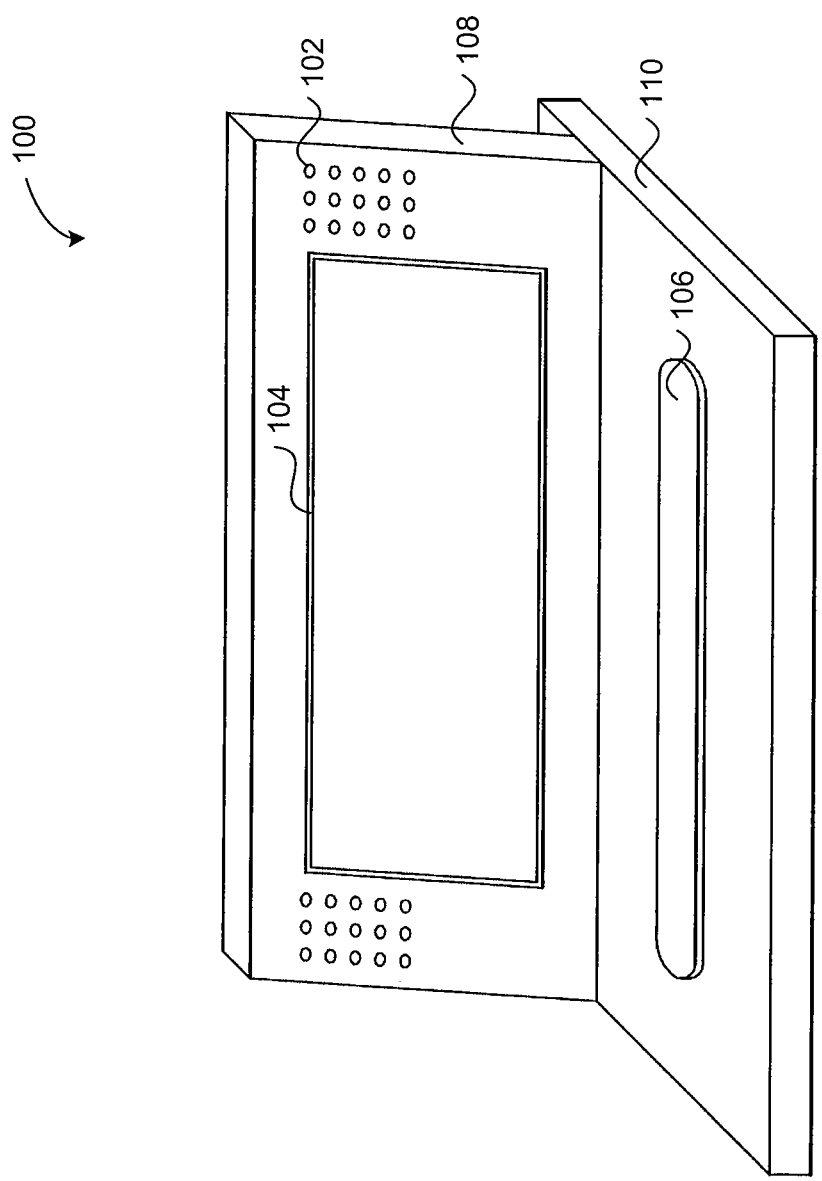
FIG. 1 is an isometric view of a computing device, according to one embodiment of the invention.

FIG. 1 is an isometric view of a computing device, according to one embodiment of the invention. In one embodiment, the computing device comprises a hand-held device (HHD) 100, as shown in FIG. 1. According to various embodiments, the HHD 100 may comprise a digital camera, a digital video camera, a digital video recorder, or other type of hand-held device. In alternative embodiments, the computing device may comprise any type of computing device, other than the HHD 100, such a personal computer, laptop, mobile phone, or the like.

As shown, the HHD 100 includes speakers 102, a touch screen 104, a touch strip 106, a cover 108, and a base 110. In one embodiment, the speakers 102 may be located to the left and the right of the touch screen 104.

In one embodiment, the touch screen 104 is implemented as a resistive touch screen. In alternative embodiments, the touch screen 104 may be implemented as a surface capacitive touch screen, a projected capacitive touch screen, or any technically feasible type of touch screen. For example, a user may activate user interface elements on the touch screen 104 using a finger or a stylus.

In some embodiments, the touch strip 106 is implemented as a capacitive-touch surface. In other embodiments, the touch strip 106 may be implemented as resistive touch surface. In still further embodiments, the touch strip 106 is omitted from the HHD 100 and user can manipulate the user interface through the touch screen 104.

In some embodiments, the cover 108 can be positioned in one of two positions, including an upright position or a closed position. FIG. 1 illustrates the cover 108 in the upright position. In the closed position, the cover 108 lies in parallel to the base 110 and the touch strip 106 is hidden behind the cover 108. When the cover 108 is in the closed position, the user may slide the cover 108 along tracks that cause the cover 108 to be placed into the upright position. To return the cover 108 to the closed position, the user may slide the cover 108 back to the closed position along the tracks. In alternative embodiments, any technically feasible mechanism for causing the cover 108 to alternate between the upright position and the closed position may be implemented. In some embodiments, the cover 108 may not be moveable between two different positions and may be immobile.

In one embodiment, when the cover 108 is placed in the closed position, the HHD 100 enters into a record mode. When the HHD 100 is in the record mode, the user can operate the touch screen 104 and/or the touch strip 106 to capture videos and/or photos using the HHD 100. For example, in some implementations, the user cannot access the touch strip 106 when the cover 108 is placed in the closed position. In other implementations, such as when the touch strip 106 is located on the surface of the cover 108, the user can access both the touch screen 104 and the touch strip 106 when the cover 108 is placed in the closed position. In one embodiment, when the cover 108 is opened and placed in the upright position (as shown in FIG. 1), the HHD 100 enters a navigation mode, where the user can operate the touch screen 104 and/or the touch strip 106 to interact with and play back the videos and/or photos stored on the HHD 100.

Figure 2:
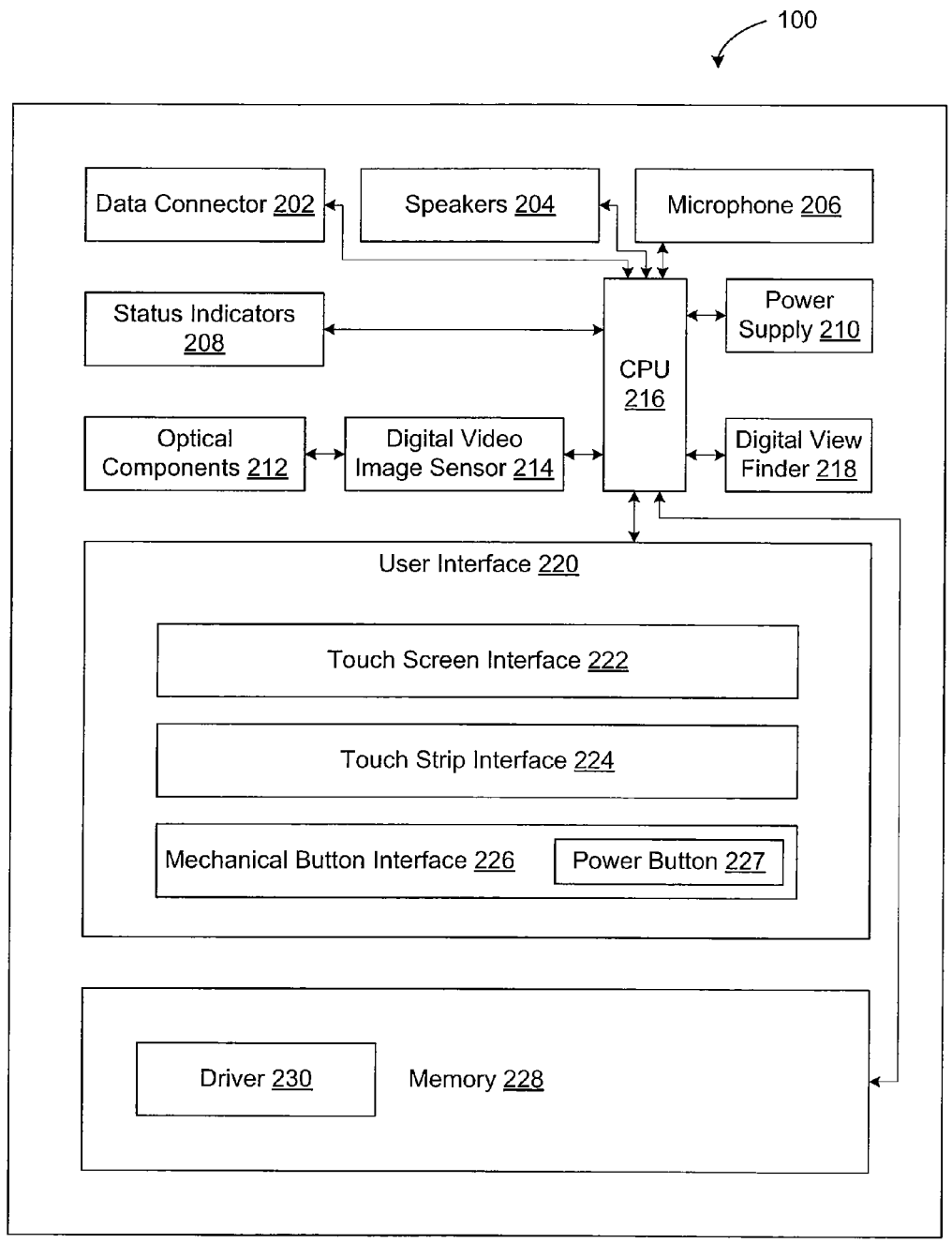
FIG. 2 is a block diagram of the hand-held device, according to one embodiment of the invention.

FIG. 2 is a block diagram of the HHD 100, according to one embodiment of the invention. As shown, the HHD 100 includes, without limitation, a data connector 202, a speaker 204, a microphone 206, status indicators 208, a power supply 210, optical components 212, a digital video image sensor 214, a central processing unit (CPU) 216, a digital viewfinder 218, a user interface 220, and an internal memory 228. In one embodiment, the HHD 100 is a digital video camera.

The data connector 202 is an integrated mechanism that allows the HHD 100 to be connected with a separate TV or computer system, such as laptop or a desktop computer, and to transfer data to and from the computer system and/or output video and audio to the TV. The data connector 202 may be a universal serial bus (USB) connector, a firewire connector, a HDMI connector, a serial connector, or another type of connector that is capable of connecting the HHD 100 with the TV or the computer system. In some embodiments, the data connector may be wireless network adapter configured to allow the HHD 100 to connect to a wireless network.

The status indicators 208 visually indicate the current mode of operation of the HHD 100. The status indicators 208 include light emitting diodes (LEDs) that can be "ON," blinking, or "OFF," depending on the current operating mode of the HHD 100. The operating modes of the HHD 100 include, among others, a record mode and a playback mode. When in the record mode, the HHD 100 is configured to capture video and audio of a particular scene through the optical components 212 and the microphone 206, respectively. As described above, the HHD 100 may be in record mode when the cover 108 is in the closed position.

When in the playback mode, the HHD 100 is configured to play back digital videos, photos, or other files that are stored in the internal memory 228 included in the HHD 100. The digital videos stored in the internal memory 228 may be videos captured with the HHD 100 or videos transferred to the HHD 100, but not captured by the HHD 100, including videos downloaded from the Internet. In one embodiment, the digital videos may be displayed on the digital viewfinder 218, and the audio may be output through the speakers 204. In alternative embodiments, the digital video and audio may be output to a TV or to a computer system for playback. In some embodiments, the digital viewfinder 218 comprises the touch screen 104, described in FIG. 1. For example, when the HHD 100 is in playback mode, the touch screen 104 may orient itself horizontally and allow the content stored in the internal memory 228 to be played back in full-screen mode on the touch screen 104.

The power supply 210 provides power to the HHD 100. The power may be provided by a battery or an external power source (e.g., an AC outlet). In one embodiment, the battery is a rechargeable battery that is not removable from the HHD 100. In alternative embodiments, the battery may include one or more removable and/or replaceable batteries. The optical components 212, which may include one or more lenses, capture the scene and direct light associated with the scene onto the digital video image sensor 214. The digital video image sensor 214 converts the captured image into digital video data and then transmits the digital video data to the CPU 216 for further processing.

The microphone 206, which may comprises one or more individual microphones, captures the sound in the scene. In one embodiment, the microphone includes hardware and/or software configured to convert the captured sound to digital audio data and to transmit the digital audio data to the CPU 216 for further processing. In alternative embodiments, the microphone may transmit raw analog data to the CPU 216 without any pre-processing.

The CPU 216 communicates with the various components within the HHD 100 to control the operations of the HHD 100. The CPU may be implemented as a single chip or as a combination of multiple chips. The CPU 216 also processes inputs from the user interface 220. For example, when the HHD 100 is in record mode, the CPU 116 transmits the digital video data received from the digital video image sensor 214 to the digital viewfinder 218 for display. In one embodiment, the CPU 216 combines the digital audio data received from the microphone 206 and the digital video data received from the digital video image sensor 214 to create a composite video file. The composite video file may then be transmitted to the internal memory 228 for storage. When the HHD 100 is in playback mode, the CPU 216 retrieves the composite video file from the internal memory 228 and transmits the video portion of the composite video file to the digital viewfinder 218 and the audio portion of the composite video file to the speakers 204. In alternative embodiments, the digital audio data received from the microphone 206 and the digital video data received from the digital video image sensor 214 may be stored separately in the internal memory 228.

When the HHD 100 is in playback mode, the digital viewfinder 218 may be configured to display composite video files stored on the HHD 100. When the HHD 100 is in record mode, the digital viewfinder 218 may be configured to display an image of the scene being captured while the corresponding composite video file is being recorded.

The user interface 220 includes a touch screen interface 222, a touch strip interface 224, and/or a mechanical button interface 226. In some embodiments, the touch screen interface 222 is used to display information to the user and to process input received from the user through the touch screen 104. For example, when the HHD 100 is in playback mode, the touch screen interface 222 may provide user interface elements that allow the user to play, pause, stop, fast forward, rewind, and/or otherwise control the playback of video files on the touch screen 104. In some embodiments, the user interface elements that comprise the touch screen interface 222 may be an overlay over the video and/or photo being displayed on the touch screen 104. In some embodiments, the user may cause the user interface elements that comprise the touch screen interface 222 to be displayed and enabled by pressing and holding anywhere on the touch screen 104 during playback. Similarly, in some embodiments, the user may cause the user interface elements that comprise the touch screen interface 222 to be not displayed and disabled by pressing anywhere on the touch screen 104 during playback.

The functions provided by the touch screen interface 222 and touch screen 104 in the various operating modes of the HHD 100 are described in greater detail below in conjunction with FIGS. 3A-3C, 4A-4C, 5, and 6.

In one embodiment, the touch strip interface 224 is used to process input received from the user through the touch strip 106. For example, when the HHD 100 is in playback mode, the touch strip 106 can be used to scroll left and right through video thumbnails that are displayed on the touch screen 104. The scroll left and/or scroll right inputs generated by the user are received by the touch strip 106 and processed by the touch strip interface 224.

The mechanical button interface 226 may include a power button 227. The power button 227 is configured to turn the HHD 100 ON and OFF. In some embodiments, the power button 227 is implemented as a capacitive-touch button. In alternative embodiments, the power button 227 may be implemented as an induction button, an analog-resistive button, or any other technically feasible button type that can be engaged by the user. In some embodiments, the power button may be included in the touch screen interface 222 and/or the touch strip interface 224, and the mechanical button interface 226 is omitted.

The internal memory 228 stores the composite video files as well as firmware that is executed by the CPU 216 to control the operations of the HHD 100. The internal memory 228 comprises either volatile memory, such as dynamic random access memory (DRAM), or non-volatile memory, such as a hard disk or a flash memory module, or a combination of both volatile and non-volatile memory. The internal memory 228 also stores a software driver 230 implemented as a set of program instructions configured to coordinate operation between the user interface 220 and the other components of the HHD 100, as described in greater detail herein. For example, the program instructions that constitute the driver 240 may be executed by the CPU 216 to cause different composite video file thumbnails to be displayed.

The HHD 100 provides only one example of a hand-held device, in accordance with embodiments of the invention. Any other devices having any number of different elements are also within the scope of embodiments of the invention.

Figure 3A:
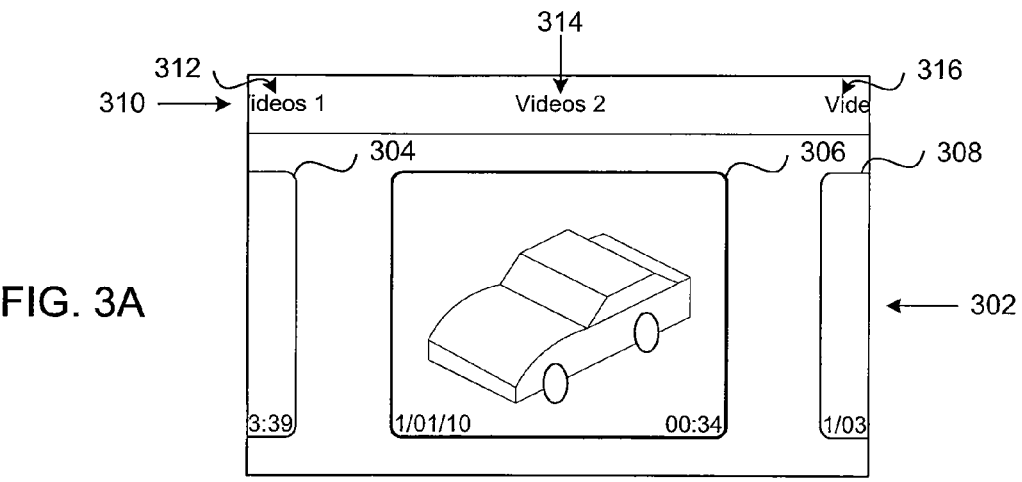
FIGS. 3A-3C are conceptual diagrams illustrating activating tabs associated with a user interface element using a touch screen interface associated with a hand-held device, according to various embodiments of the invention.
Figure 3B:
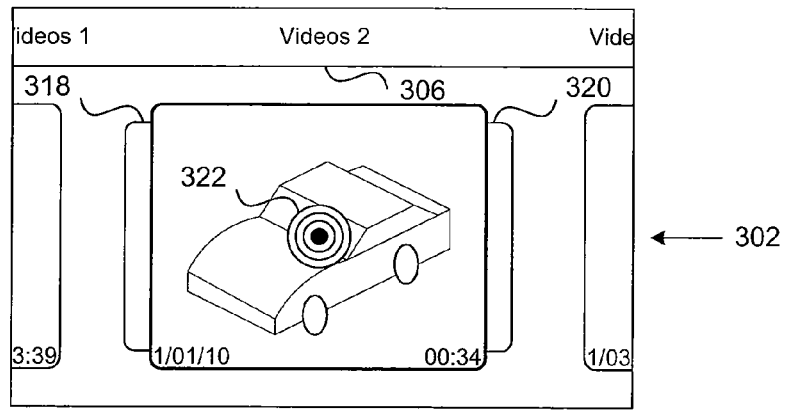
Figure 3C:
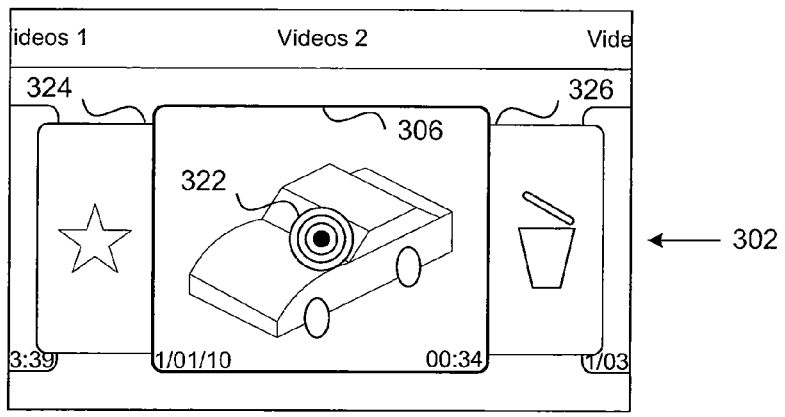

FIGS. 3A-3C are conceptual diagrams illustrating activating partial and full tabs using a touch screen interface associated with a hand-held device, according to various embodiments of the invention. FIG. 3A illustrates a user interface 302 that is displayed on the touch screen 104 when a user has activated a playback mode of the HHD 100, according to one embodiment of the invention. In some embodiments, the playback mode is automatically activated when the cover 108 is placed in the upright position, as described above. As also shown in FIG. 3A, the user interface 302 includes a folder bar 310 that includes a previous folder 312, a current folder 314, and a next folder 316. In one embodiment, a central portion of user interface 302 displays thumbnails of a previous video 304, a current video 306, and a next video 308.

In some embodiments, each of the previous video 304, the next video 308, and the current video 306 may include display information associated the date of recordation and the duration of the video. In alternative embodiments, the previous video 304, the next video 308, and the current video 306 may also include additional display information, such as video resolution, audio quality, and the time of day that the video was recorded. The information can be displayed anywhere within the user interface 302, such as underneath each video thumbnail, or within each video thumbnail, as depicted in FIGS. 3A-3C. To play back the current video 306, the user may touch the thumbnail of the current video.

The folder bar 310 is used to communicate the folders that are associated with the video thumbnails displayed within user interface 302. In one embodiment, the positions of the previous folder 312, the current folder 314, and the next folder 316 change within the folder bar 310 in response to a user selecting the previous video 304 or the next video 308, herein referred to as scrolling. In some embodiments, a user can scroll through the thumbnails of the videos displayed within the user interface 302 by repeatedly selecting the previous video 304 or the next video 308 by means of establishing contact with the touch screen within the boundaries of the previous video 304 or the next video 308, respectively. In other embodiments, a user is also able to scroll through the thumbnails of the videos displayed within the user interface 302 by using the touch strip 106, described in FIG. 1. The touch strip 106, which is activated by touch by the user, allows the user to scroll through the video thumbnails to the left or right. For example, a user can scroll through the video thumbnails to the left by dragging their finger from the right side of the touch strip 106 to the left side of touch strip 108. In one embodiment, the user scrolls through the video thumbnails to the right by repeatedly touching the next video 308 using the touch screen 104. As each next video 308 is selected, the previous video 306 is replaced by the current video 306, the current video 306 is replaced by the next video 308, and the next video 308 is replaced by another next video 308, if present. In one embodiment, the display location of the next folder 316 moves closer to the center of the folder bar 310 to communicate to the user that he or she is nearing the last file of current folder 314. When the HHD 100 determines that the current video 306 displayed in the user interface is included in the folder represented by the next folder 316, then the next folder 316 will snap into the position of the current folder 314 in the folder bar 310, and the current folder 314 becomes the previous folder 312 that is displayed on the far left of the folder bar 310. Additionally, the next folder 316 is replaced by an additional next folder 316. The changes in position of the previous folder 312, the current folder 314, and the next folder 316 within the folder bar 310 provide, to the user, an intuitive understanding of the parent that are associated with the video thumbnails displayed within the user interface 302.

FIG. 3B is an illustration of a user interface 302 that is displayed when a user establishes a contact point 322 with the touch screen 104 and when the contact point 322 is within the bounds of the current video 306, according to one embodiment of the invention. As shown, partial tab 318 and partial tab 320 appear to the left and right of the current video, respectively, when the contact point 322 is established with the touch screen 104. In alternative embodiments, the partial tab 318 and the partial tab 320 may be displayed in a vertical fashion, where the partial tab 318 is shown above the current video 306 and where the partial tab 320 is shown below the current video 306. In some embodiments, when contact point 322 is established with the touch screen 104, the current video 306 is overlaid with a bright color. The bright color assists in providing verification to the user that the user has activated a particular function associated with the user interface.

FIG. 3C is an illustration of user interface 302 that is displayed when the user maintains contact with the touch screen 104 for a time period that is longer than a particular threshold, according to one embodiment of the invention. In one embodiment, the threshold can be customized by the user of the HHD 100. In some embodiments, the threshold amount is not satisfied simply by moving a cursor over a user interface element or by selecting a user interface element (e.g., by clicking on the user interface element). Rather, the user may "hold" down a selection using a touch-sensitive button or screen, a mechanical button, or cursor to satisfy the threshold amount. As shown, the partial tab 318 and partial tab 320, shown in FIG. 3B, are replaced by full tab 324 and full tab 326, respectively. In one embodiment, full tab 324 and full tab 326 include symbols that are representative of the function that is performed when the full tab is selected by the user.

According to some embodiments, when the user initially makes contact with the touch screen on the current video, the partial tabs 318, 320 shown in FIG. 3B are not displayed. Instead, in these embodiments, if the user presses-and-holds his or her finger on the touch screen on the current video for a threshold amount of time, then the full tabs are displayed, as shown in FIG. 3C.

In various embodiments, the functionality of full tab 324 and full tab 326 can be represented through text, symbols, images, animations, videos, or the like. For example, one full tab may display a star symbol for marking the current video as a favorite, and the other full tab may display a trash symbol for marking the current video for deletion. In some embodiments, when the full tab that displays the trash symbol is selected by the user, the full tab that displays the star symbol and the full tab that displays the trash symbol are replaced by a full tab that displays "Yes" to confirm the deletion of the video and a full tab that displays "No" to cancel the deletion of the video, respectively. If the full tab that displays "No" is selected, the full tabs are no longer displayed on each side of the current video 306. Alternatively, if the full tab that displays "Yes" is selected, the video is deleted and the current video thumbnail is removed from the user interface 302. In some embodiments, the video is also deleted from the internal memory 228 of the HHD 100.

Figure 4A:
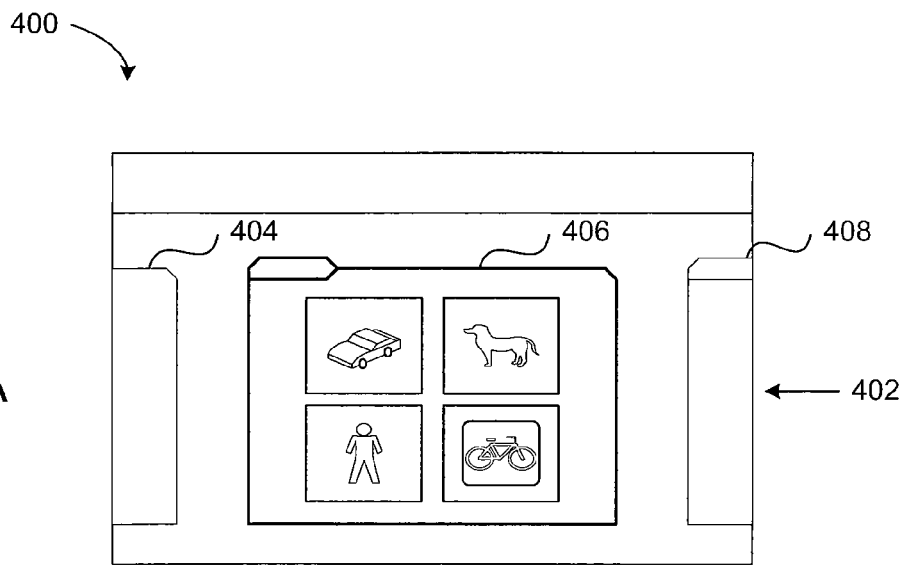
FIGS. 4A-4C are conceptual illustrations of a touch screen interface associated with a hand-held device, according to various embodiments of the invention.

FIG. 4A is a conceptual diagram illustrating a user interface 402 that is displayed when the user has activated a folder navigation mode of the HHD 100, according to one embodiment of the invention. In some embodiments, the folder navigation mode is automatically activated when the cover 108 is placed in the upright position, as described above. In other embodiments, the folder navigation mode is activated when the user is in playback navigation mode and establishes contact with the touch screen 104 where the contact is within the boundaries of the folder bar 310. According to embodiments of the invention, a folder comprises one or more locations or directories associated with one or more files. When contact is made with the folder bar 310, the playback navigation mode transitions to the folder navigation mode of the HHD 100, and the user interface 302 is replaced by the user interface 402. The user interface 402 includes a previous folder 404, a current folder 406, and a next folder 408. In one embodiment, each of the previous folder 404, current folder 406, and next folder 408 display thumbnails of the first four videos included in the folder. In alternative embodiments, each of the previous folder 404, the current folder 406, and the next folder 408 display information associated with the folder such as the number of videos in the folder, the folder size, the date the folder was created, among others.

Figure 4B:
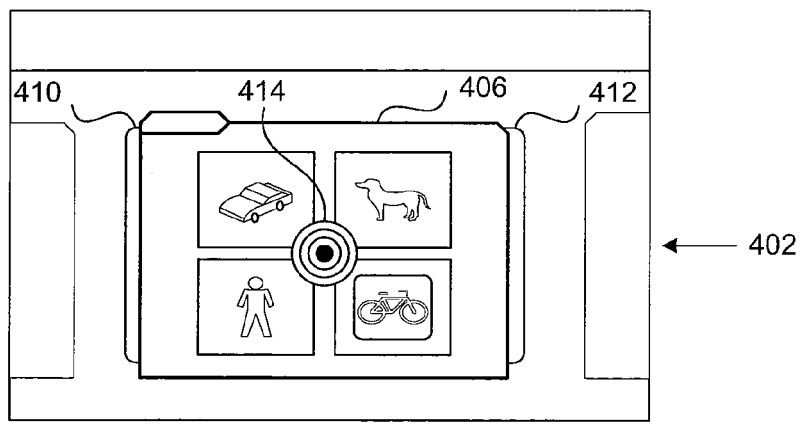

FIG. 4B is a conceptual diagram illustrating a user interface 402 that is displayed when a user establishes a contact point 414 with the touch screen 104 and when the contact point 414 is within the bounds of the current folder 406, according to one embodiment of the invention. As shown, partial tab 410 and partial tab 412 appear when the contact point 414 is established with the touch screen 104. In some embodiments, when contact point 414 is established, the current folder 406 is overlaid with a bright color when the partial tab 410 and the partial tab 412 appear on each side of the current folder 406. In alternative embodiments, the partial tab 410 and the partial tab 412 may be displayed in a vertical fashion, where the partial tab 410 is shown above the current folder 406 and where the partial tab 412 is shown below the current folder 406.

Figure 4C:
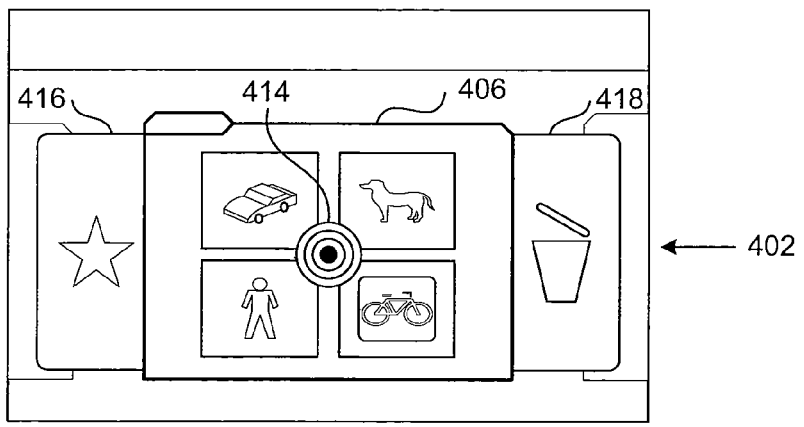

FIG. 4C is a conceptual diagram illustrating a user interface 402 that is displayed when the user maintains contact with the touch screen 104 for a time period that is longer than a particular threshold. In one embodiment, the threshold may be customized by the user. As shown, the partial tab 410 and the partial tab 412 are replaced by full tab 416 and full tab 418, respectively. In one embodiment, full tab 416 and full tab 418 include symbols that represent the function that is performed when the tab is selected by the user.

According to some embodiments, when the user initially makes contact with the touch screen on the current folder, the partial tabs 410, 412 shown in FIG. 4B are not displayed. Instead, in these embodiments, if the user presses-and-holds his or her finger on the touch screen on the current folder for a threshold amount of time, then the full tabs are displayed, as shown in FIG. 4C.

In various embodiments, the functions associated with full tab 416 and full tab 418 can be represented by text, symbols, images, animations, videos, or the like, as described above in FIG. 3C. For example, one full tab may display a star symbol for marking the folder as a favorite, and the other full tab may display a trash symbol for marking the folder for deletion. In some embodiments, when the full tab that displays the trash symbol is selected by the user, the full tab that displays a star symbol and the full tab that displays a trash symbol are replaced by a full tab that displays "Yes" to confirm the deletion of the folder and a full tab that displays "No" to cancel the deletion of the folder, respectively. If the full tab that displays "No" is selected, the full tabs are no longer displayed on each side of the current folder. Alternatively, if the full tab that displays "Yes" is selected, the folder is deleted and the folder thumbnail is removed from the user interface 302. In some embodiments, the videos included in the deleted folder are deleted from the internal memory 228 of the HHD 100.

Figure 5:
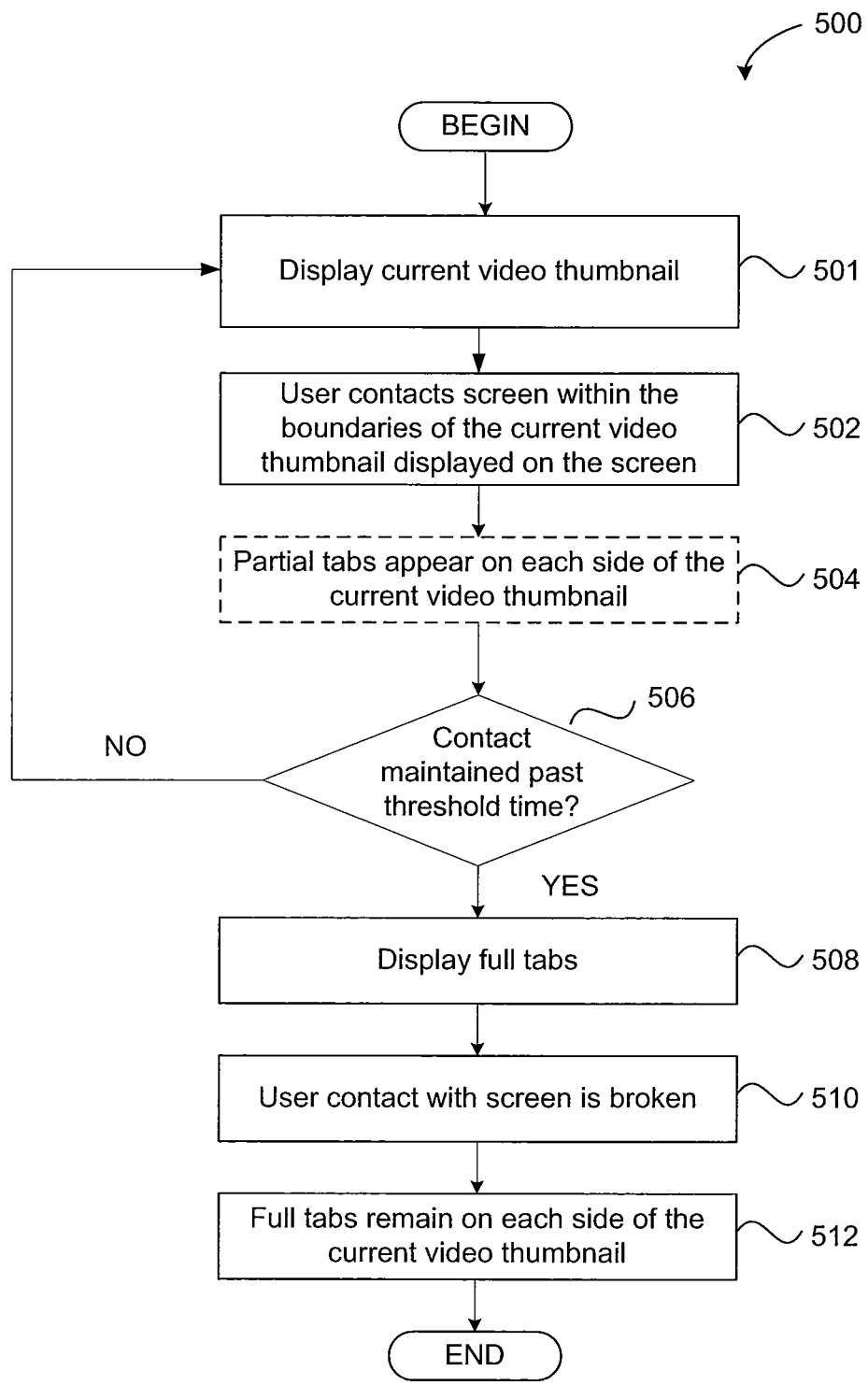
FIG. 5 is a flow diagram of method steps for activating tabs when the touch screen interface is in navigation mode, according to one embodiment of the invention.

FIG. 5 is a flow diagram of method steps for activating tabs when the touch screen interface is in playback mode, according to one embodiment of the invention. Persons skilled in the art will understand that, even though the method is described in conjunction with the systems of FIGS. 1-4C, any system configured to perform the method steps, in any order, is within the scope of embodiments of the invention.

As shown, the method 500 begins at step 501, where a processor causes a touch screen to display a current video thumbnail within a user interface. At step 502, a user contacts the touch screen of the HHD at a location within the boundaries of the current video thumbnail that is displayed on the touch screen. At step 504, a processor included in the HHD causes partial tabs to be displayed on each side of the current video thumbnail. In some embodiments, step 504 is optional and is omitted.

At step 506, the processor determines whether the user contact is maintained past a threshold amount of time. In an embodiment, the threshold time is configurable by the user. For example, the threshold time may be approximately two seconds. If, at step 506, the processor determines that the user contact is maintained longer than the threshold time, then the method 500 proceeds to step 508.

At step 508, the processor causes full tabs to be displayed. In embodiments where partial tabs are displayed at step 504, at step 508, the partial tabs may be replaced by full tabs. For example, the partial tabs may be enlarged, through an animation, into the full tabs. Each of the partial tabs slides further out to the left and right of the current video thumbnail, respectively, until the full tabs are completely visible. In alternate embodiments, the processor instructs the speaker to emit a clicking noise to communicate to the user that the full tabs are locked into the full position, and that the user contact can be broken. In embodiments where the partial tabs are not displayed and step 504 is omitted, the full tabs are displayed at step 508 after the contact is maintained longer than the threshold amount of time, without any other indication to the user.

At step 510, the processor determines that the user has broken contact with the touch screen. In one embodiment, the user breaks contact with the touch screen by either dragging their finger across the touch screen to a portion of the user interface that is outside of the boundaries of the current video thumbnail. In other embodiments, the user breaks contact with the screen by simply lifting his or her finger away from the touch screen so that a physical connection between the user and the touch screen no longer exists.

At step 512, the user has broken contact with the touch screen, and the processor causes the full tabs to remain displayed on each side of the current video thumbnail. As described in FIGS. 3C and 4C, the full tabs may include symbols that represent the function that is performed when the full tab is selected by the user. In some embodiments, the functions associated with the full tabs can be represented by text, symbols, images, animations, videos, or the like. In one embodiment, one full tab includes a contrast symbol, and another full tab includes a brightness symbol. If the user selects the tab associated with the brightness symbol, each of the full tabs is replaced by an additional full tab, where one of the replacement tabs includes a "+" symbol and the other replacement tab includes a "−" symbol. The tab associated with the "+" symbol, when selected, increases the contrast of the video associated with the current video thumbnail, while the tab associated with the "−" symbol, when selected, decreases the contrast of the video associated with the current video thumbnail. The user can establish contact with the touch screen in an area outside of the boundaries of the current video thumbnail to cause both of the full tabs to be hidden.

Referring back to step 506, if the processor determines that the user contact is maintained for less than the threshold time, then the method 500 returns to step 501, described above. In one embodiment, the user changes his or her mind and no longer requires the additional features that would be provided if the threshold time was met.

In embodiments where the partial tabs are displayed at step 504, the processor causes the partial tabs to be removed from each side of the current video thumbnail when the user contact is maintained for less than the threshold time. In some embodiments, the processor causes the speakers to emit a sound that communicates to the user that the partial tabs are no longer displayed. In another embodiment, the screen flashes and the user interface displays the current video thumbnail with no partial tabs or full tabs displayed.

Figure 6:
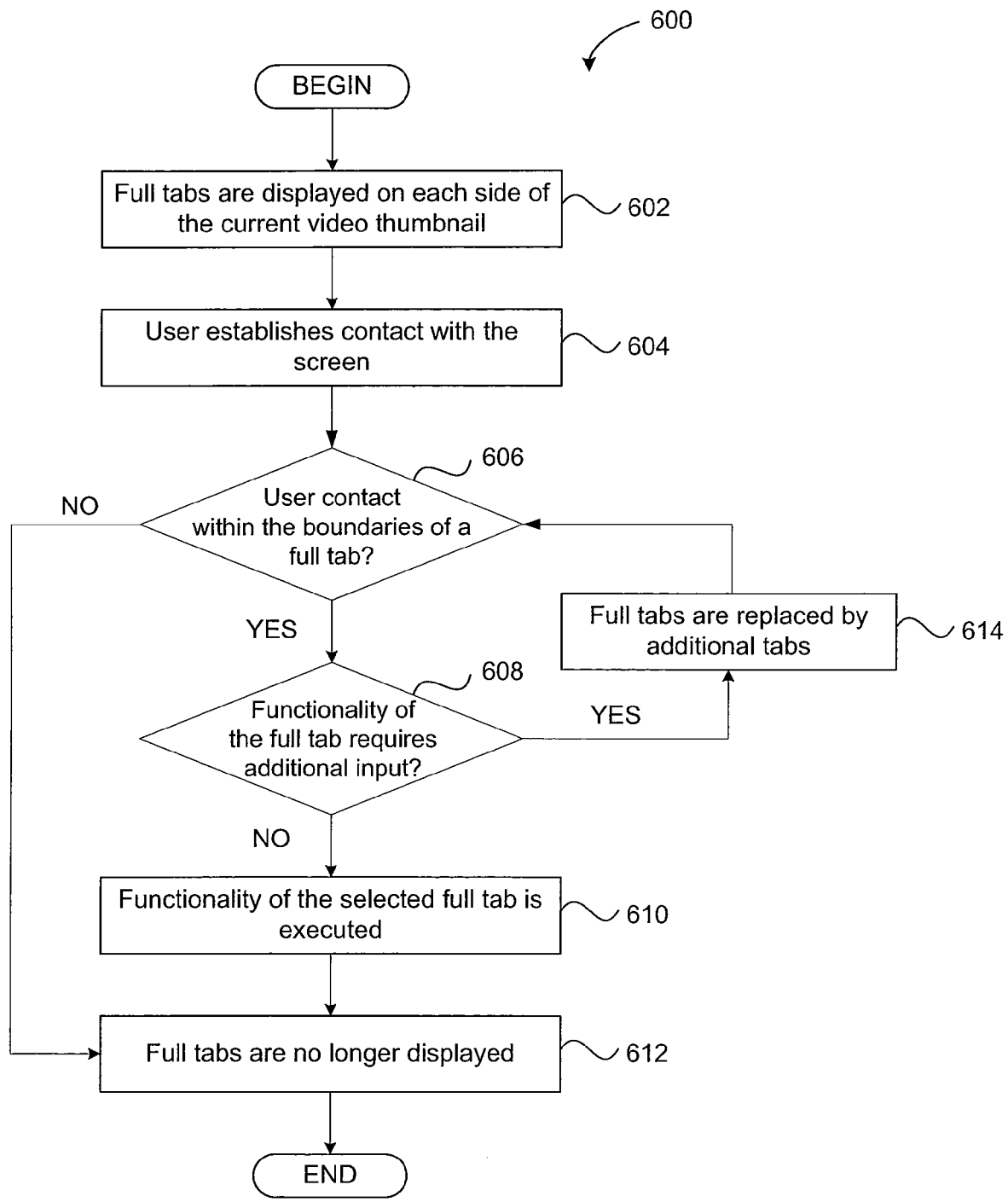
FIG. 6 is a flow diagram of method steps for executing functionalities associated with the tabs, according to one embodiment of the invention.

FIG. 6 is a flow diagram of method steps for executing functionalities associated with the tabs, according to one embodiment of the invention. Persons skilled in the art will understand that, even though the method is described in conjunction with the systems of FIGS. 1-4C, any system configured to perform the method steps, in any order, is within the scope of embodiments of the invention.

As shown, the method 600 begins at step 602, where the processor causes full tabs to be displayed on each side of the current video thumbnail. In one embodiment, the processor causes the full tabs to be displayed after the user has made contact with the current video for longer than a particular threshold, as described in FIG. 5. At step 604, the user establishes contact with the touch screen.

At step 606, the processor determines whether the user contact with the touch screen is within the boundaries of a full tab that is displayed on the touch screen. If, at step 606, the processor determines that the user contact is within the boundaries of a full tab, then the method 600 proceeds to step 608.

At step 608, the processor determines whether the functionality of the selected full tab requires additional input from the user. For example, a tab that is associated with a contrast adjustment function, if selected, causes the processor to replace each displayed full tab with a replacement tab, where one of the replacement full tabs includes a "+" symbol and the other replacement tab includes a "−" symbol, where the tab associated with the "+" symbol, when selected, increases the contrast of the video associated with the current video thumbnail, and where the tab associated with the "−" symbol, when selected, decreases the contrast of the video associated with the current video thumbnail. If, at step 608, the processor determines that the functionality of the selected full tab requires additional input from the user, then the method 600 proceeds to step 614.

At step 614, the processor causes the full tabs to be replaced by replacement full tabs that are associated with the selected tab. For example, a selected full tab that displays a trash symbol is selected by the user. Subsequent to the selection of the full tab associated with the trash symbol, each of the full tabs currently displayed is replaced by a replacement full tab that displays "Yes" to confirm the deletion of the video and a replacement full tab that displays "No" to cancel the deletion of the video, respectively. If the full tab that displays "No" is selected, the full tabs are no longer displayed on each side of the current video thumbnail. Alternatively, if the full tab that displays "Yes" is selected, the video that is associated with the current video thumbnail is deleted and the current video thumbnail is removed from the user interface.

Referring back to step 608, if the processor determines that the functionality of the selected full tab does not require additional input from the user, then the method 600 proceeds to step 610. For example, if the user selects a full tab that is associated with a "mark as favorite" function, no additional input through replacement full tabs is required, as the video associated with the current video thumbnail requires only a single input to be marked as a favorite.

At step 610, the processor executes the functionality of the selected full tab. For example, if the user selects a full tab that is associated with a "mark as favorite" function, the processor updates the information that is associated with the video file to mark the video file as a favorite video.

At step 612, the processor causes the full tabs to be no longer displayed on each side of the current video thumbnail. In one embodiment, the processor causes the speakers to emit a sound that communicates to the user that the tabs are no longer displayed. In another embodiment, the screen flashes and the user interface displays the current video thumbnail with no partial tabs or full tabs displayed.

Referring back to step 606, if the processor determines that the user contact is not within the boundaries of a full tab that is displayed on the touch screen, then the method 600 proceeds to step 612, described above.

According to various embodiments of the invention, the methods 500 and 600, described in FIGS. 5 and 6, respectively, apply equally to user interface elements associated with individual video or media files, as well as to folders that include one or more video or media files. In addition, in some embodiments, the partial tabs and/or full tabs may be displayed in response to user input other than a user touching a touch screen. For example, a user may use a mechanical button or other pointing device (e.g., a mouse cursor) to select a particular user interface element. If the user holds down the mechanical button or the other pointing device for longer than the threshold amount of time, then the full tabs may be displayed to provide additional functionality, as described herein.

One embodiment of the invention provides a method for activating tabs that are associated with GUI (graphical user interface) elements that are displayed on a touch screen. The tabs are activated when a user establishes contact with the touch screen for an amount of time longer than a threshold amount and when the contact point is within the boundaries of a GUI element. In some embodiments, when such a contact is initially made with the touch screen, small GUI elements are immediately displayed, referred to as partial tabs, that communicate to the user that additional functionality is associated with and available for the GUI element. In other embodiments, the partial tabs are not displayed when the initial contact is made. If the user contact is maintained beyond the particular threshold, full tabs are displayed. In embodiments where partial tabs are displayed, the partial tabs are replaced by full tabs if the threshold amount of time is satisfied. When the full tabs are displayed and the user breaks contact with the touch screen, the full tabs remain displayed. Each full tab is associated with one or more functions to be performed to the content associated with the GUI element. A description of the function associated with each full tab may be communicated to the user using text, symbols, images, animations, videos, or the like. When a full tab is selected by the user, the functionality of the full tab is executed.

One advantage of the embodiments of the invention is that users can more easily identify functionality associated with a particular GUI element. Implementing "tabs" to provide certain functionality simplifies the typical learning curve that is associated with manipulating the user interface of a handheld device. Another advantage is that the device can be manufactured having fewer mechanical buttons, resulting in cheaper manufacturing cost.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for interacting with a video file stored on a computing device that includes a display, the method comprising:
   causing a first user interface element to be displayed on the display;
   receiving user input;
   upon receiving the user input, causing a first partial tab to be displayed on a first side of the first user interface element;
   determining that the user input is received for a duration of time greater than a threshold value;
   in response to determining, causing a first full tab to replace the first partial tab on the first side of the first user interface element, wherein the first full tab is associated with a first function for increasing an attribute associated with the video, the first full tab comprising a visual representation of increasing the attribute; and
   causing a second full tab to be displayed on a second side of the first user interface element, wherein the second full tab is associated with a second function for decreasing the attribute associated with the video file, the second full tab comprising a visual representation of decreasing the attribute.

2. The method of claim 1, wherein the first side of the first user interface element comprises the left side of the first user interface element, and the second side of the first user interface element comprises the right side of the first user interface element.

3. The method of claim 1, wherein the first side of the first user interface element comprises the top side of the first user interface element, and the second side of the first user interface element comprises the bottom side of the first user interface element.

4. The method of claim 1, wherein the first function is executed when the user selects the first full tab, and the second function is executed when the user selects the second full tab.

5. The method of claim 4, wherein the first function comprises at least one of, a modify contrast function and a modify brightness function.

6. The method of claim 1, wherein the first user interface element is associated with the video file.

7. The method of claim 1, wherein the first user interface element is associated with a folder associated with one or more video files stored on the computing device.

8. The method of claim 1, wherein the user input comprises one of: a selection of the first user interface element via at least one of a touch-sensitive button or screen, a mechanical button, and a cursor and a movement of the cursor over the first user interface element in the display.

9. A non-transitory computer-readable storage medium storing instructions that, when executed by a processor, cause a computing device to interact with a video file, by performing the steps of:
   causing a first user interface element to be displayed on the display;
   receiving user input;
   upon receiving the user input, causing a first partial tab to be displayed on a first side of the first user interface element;
   determining that the user input is received for a duration of time greater than a threshold value; and in response to determining, causing a first full tab to replace the first partial tab on the first side of the first user interface element, wherein the first full tab is associated with a first function for increasing an attribute associated with the video file, the first full tab comprising a visual representation of increasing the attribute; and causing a second full tab to be displayed on a second side of the first user interface element, wherein the second full tab is associated with a second function for decreasing the attribute associated with the video file, the second full tab comprising a visual representation of decreasing the attribute.

10. The computer-readable storage medium of claim 9, wherein the first side of the first user interface element comprises the left side of the first user interface element, and the second side of the first user interface element comprises the right side of the first user interface element.

11. The computer-readable storage medium of claim 9, wherein the first side of the first user interface element comprises the top side of the first user interface element, and the second side of the first user interface element comprises the bottom side of the first user interface element.

12. The computer-readable storage medium of claim 9, wherein the first function is executed when the user selects the first full tab, and the second function is executed when the user selects the second full tab.

13. The computer-readable storage medium of claim 12, wherein the first function comprises at least one of, a modify contrast function and a modify brightness function.

14. The computer-readable storage medium of claim 9, wherein the first user interface element is associated with the video file.

15. The computer-readable storage medium of claim 9, wherein the first user interface element is associated with a folder associated with one or more video files stored on the computing device.

16. The computer-readable storage medium of claim 9, wherein the user input comprises a selection of the first user interface element via at least one of a touch-sensitive button or screen, a mechanical button, and a cursor.

17. A computer system, comprising:
a processor; and
a memory storing instructions that when executed by the processor cause the computer system to interact with a video file, by performing the steps of:
causing a first user interface element to be displayed on a display;
receiving user input;
upon receiving the user input, causing a first partial tab to be displayed on a first side of the first user interface element;
determining that the user input is received for a duration of time greater than a threshold value;
in response to determining, causing a first full tab to replace the first partial tab on the first side of the first user interface element, wherein the first full tab is associated with a first function for increasing an attribute associated with the video file, the first full tab comprising a visual representation of increasing the attribute; and
causing a second full tab to be displayed on a second side of the first user interface element, wherein the second full tab is associated with a second function for decreasing the attribute associated with the video file, the second full tab comprising a visual representation of decreasing the attribute.

* * * * *